(12) United States Patent
Sakai

(10) Patent No.: US 8,332,494 B2
(45) Date of Patent: Dec. 11, 2012

(54) DEVICE MANAGEMENT SYSTEM, SERVERS, METHOD FOR MANAGING DEVICE, AND COMPUTER READABLE MEDIUM

(75) Inventor: Tetsuo Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 12/368,162

(22) Filed: Feb. 9, 2009

(65) Prior Publication Data

US 2009/0216865 A1   Aug. 27, 2009

(30) Foreign Application Priority Data

Feb. 22, 2008   (JP) ................................ 2008-041978

(51) Int. Cl.
*G06F 15/177* (2006.01)
(52) U.S. Cl. ........................................ 709/221; 709/224
(58) Field of Classification Search .......... 709/220–224; 726/2, 3, 23, 13; 713/100, 153, 160; 358/1.15, 358/305
See application file for complete search history.

(56) References Cited

U.S. PATENT DOCUMENTS

| | | | | |
|---|---|---|---|---|
| 6,442,615 | B1 * | 8/2002 | Nordenstam et al. | 709/241 |
| 6,885,644 | B1 * | 4/2005 | Knop et al. | 370/254 |
| 2002/0178382 | A1 * | 11/2002 | Mukai et al. | 713/201 |
| 2008/0005321 | A1 * | 1/2008 | Ma et al. | 709/224 |

FOREIGN PATENT DOCUMENTS

| | | |
|---|---|---|
| JP | 2001-188727 A | 7/2001 |
| JP | 2003-316674 A | 11/2003 |

* cited by examiner

*Primary Examiner* — Ruolei Zong
(74) *Attorney, Agent, or Firm* — Canon USA Inc IP Division

(57) ABSTRACT

A device management system includes a first server and a second server that is different from the first server. The first server includes a first management unit configured to update and delete device information of a management target device to be managed by the first server. The second server includes a second management unit configured to update and delete device information of a management target device to be managed by the second server and a display unit configured to display device information of a device which is not to be managed by the second server.

13 Claims, 18 Drawing Sheets

FIG. 5

| DEVICE NAME | PRODUCT NAME | IP ADDRESS | MAC ADDRESS | TRANSFER MANAGEMENT TO PARENT SERVER |
|---|---|---|---|---|
| Dev4 | Cxxxx xX28xxi | 172.21.2.1 | 00:00:85:33:33:33 | ✓ |
| Dev5 | Cxxxx xX85xx | 172.21.2.2 | 00:00:85:44:44:44 | ✓ |
| Dev6 | Cxxxx XXX59xx | 172.21.3.1 | 00:00:85:55:55:55 | |

| 601 | 602 | 603 | 604 | 605 |
|---|---|---|---|---|
| DEVICE NAME | IP ADDRESS | MAC ADDRESS | CURRENT MANAGEMENT SERVER | ATTRIBUTE WHEN PARENT SERVER REFERS TO DEVICE INFORMATION |
| Dev4 | 172.21.2.1 | 00:00:85:33:33:33 | CHILD SERVER | TRANSFER MANAGEMENT TO PARENT SERVER |
| Dev5 | 172.21.2.2 | 00:00:85:44:44:44 | CHILD SERVER | TRANSFER MANAGEMENT TO PARENT SERVER |
| Dev6 | 172.21.3.1 | 00:00:85:55:55:55 | CHILD SERVER | READING ONLY |

FIG. 8

| TASK NAME | TASK TYPE | EXECUTION TIMING | TARGET |
|---|---|---|---|
| SETTING DISTRIBUTION TASK | DEVICE SETTING DISTRIBUTION | 2007/06/07-20:00:00 | Dev1, Dev2, Dev3 |
| DESTINATION TABLE 1 | DESTINATION TABLE DISTRIBUTION | 2007/06/10-01:00:00 | Dev1, Dev2 |
| CHILD SERVER LIST | MANAGEMENT DEVICE LIST ACQUIREMENT | PERIODICAL EXECUTION (ONCE A DAY) | CHILD SERVER |

FIG. 9

| DEVICE NAME | IP ADDRESS | MAC ADDRESS | CURRENT MANAGEMENT SERVER | ATTRIBUTE WHEN PARENT SERVER REFERS TO DEVICE INFORMATION |
|---|---|---|---|---|
| Dev1 | 172.20.1.1 | 00:00:85:00:00:00 | PARENT SERVER | EXECUTABLE |
| Dev2 | 172.20.1.2 | 00:00:85:11:11:11 | PARENT SERVER | EXECUTABLE |
| Dev3 | 172.20.1.1 | 00:00:85:22:22:22 | PARENT SERVER | EXECUTABLE |
| Dev4 | 172.21.2.1 | 00:00:85:33:33:33 | CHILD SERVER | EXECUTABLE |
| Dev5 | 172.21.2.2 | 00:00:85:44:44:44 | CHILD SERVER | EXECUTABLE |
| Dev6 | 172.21.3.1 | 00:00:85:55:55:55 | CHILD SERVER | READING ONLY |
| 901 | 902 | 903 | 904 | 905 |

FIG. 10

| DEVICE NAME | PRODUCT NAME | IP ADDRESS ▲ | MAC ADDRESS | MANAGEMENT SERVER |
|---|---|---|---|---|
| Dev1 | Cxxxx_XXX11xx | 172.20.1.1 | 00:00:85:00:00:00 | PARENT SERVER |
| Dev2 | Cxxxx_xX_X32xx | 172.20.1.2 | 00:00:85:11:11:11 | PARENT SERVER |
| Dev3 | Cxxxx_XXX85xx | 172.20.1.3 | 00:00:85:22:22:22 | PARENT SERVER |
| Dev4 | Cxxxx_xX28xxi | 172.21.2.1 | 00:00:85:33:33:33 | CHILD SERVER |
| Dev5 | Cxxxx_xX85xx_ | 172.21.2.2 | 00:00:85:44:44:44 | CHILD SERVER |
| Dev6 | Cxxxx_XXX59xx_ | 172.21.3.1 | 00:00:85:55:55:55 | CHILD SERVER |

| DEVICE NAME | PRODUCT NAME | IP ADDRESS ▲ | MAC ADDRESS | MANAGEMENT SERVER |
|---|---|---|---|---|
| Dev1 | Cxxxx_XXX11xx | 172.20.1.1 | 00:00:85:00:00:00 | PARENT SERVER |
| Dev2 | Cxxxx_xX_X32xx | 172.20.1.2 | 00:00:85:11:11:11 | PARENT SERVER |
| Dev3 | Cxxxx_XXX85xx | 172.20.1.3 | 00:00:85:22:22:22 | PARENT SERVER |
| Dev4 | Cxxxx_xX28xxi | 172.21.2.1 | 00:00:85:33:33:33 | PARENT SERVER |
| Dev5 | Cxxxx_xX85xx_ | 172.21.2.2 | 00:00:85:44:44:44 | PARENT SERVER |
| Dev6 | Cxxxx_XXX59xx | 172.21.3.1 | 00:00:85:55:55:55 | CHILD SERVER (READING ONLY) |

| DEVICE NAME | IP ADDRESS | MAC ADDRESS | CURRENT MANAGEMENT SERVER | ATTRIBUTE WHEN PARENT SERVER REFERS TO DEVICE INFORMATION |
|---|---|---|---|---|
| Dev1 | 172.20.1.1 | 00:00:85:00:00:00 | PARENT SERVER | EXECUTABLE |
| Dev2 | 172.20.1.2 | 00:00:85:11:11:11 | PARENT SERVER | EXECUTABLE |
| Dev3 | 172.20.1.1 | 00:00:85:22:22:22 | PARENT SERVER | EXECUTABLE |
| Dev4 | 172.21.2.1 | 00:00:85:33:33:33 | PARENT SERVER | EXECUTABLE |
| Dev5 | 172.21.2.2 | 00:00:85:44:44:44 | PARENT SERVER | EXECUTABLE |
| Dev6 | 172.21.3.1 | 00:00:85:55:55:55 | CHILD SERVER | READING ONLY |

FIG. 15

| DEVICE NAME | IP ADDRESS | MAC ADDRESS | CURRENT MANAGEMENT SERVER | ATTRIBUTE WHEN PARENT SERVER REFERS TO DEVICE INFORMATION |
|---|---|---|---|---|
| Dev6 | 172.21.3.1 | 00:00:85:55:55:55 | CHILD SERVER | READING ONLY |

FIG. 16

| TASK TYPE | SETTING | REFERENCE |
|---|---|---|
| DEVICE SEARCH | – | ○ |
| SETTING DISTRIBUTION | ○ | – |
| RESTART | ○ | – |
| ERROR MONITOR | – | ○ |
| NUMBER-OF-PRINTS ACQUIREMENT | – | ○ |
| PRINT RESOURCES DISTRIBUTION | ○ | – |
| ADDRESS BOOK DISTRIBUTION | ○ | – |
| . | . | . |

| TASK NAME | TASK TYPE | DATE OF EXECUTION | TARGET DEVICE |
|---|---|---|---|
| SETTING 1 | SETTING DISTRIBUTION | 2007/05/01 | Dev4, Dev5, Dev6 |
| SEARCH | DEVICE SEARCH | 2007/05/10 | Dev6 |
| MONITOR | DEVICE MONITOR | 2007/05/10 | Dev6 |
| SEARCH | DEVICE SEARCH | 2007/05/20 | Dev6 |
| MONITOR | DEVICE MONITOR | 2007/05/20 | Dev6 |
| SEARCH | DEVICE SEARCH | 2007/05/30 | Dev6 |
| MONITOR | DEVICE MONITOR | 2007/05/30 | Dev6 |

| DEVICE NAME | IP ADDRESS | MAC ADDRESS | CURRENT MANAGEMENT SERVER | ATTRIBUTE WHEN PARENT SERVER REFERS TO DEVICE INFORMATION |
|---|---|---|---|---|
| Dev4 | 172.21.2.1 | 00:00:85:33:33:33 | CHILD SERVER | TRANSFER MANAGEMENT TO PARENT SERVER |
| Dev5 | 172.21.2.2 | 00:00:85:44:44:44 | CHILD SERVER | TRANSFER MANAGEMENT TO PARENT SERVER |
| Dev6 | 172.21.3.1 | 00:00:85:55:55:55 | CHILD SERVER | TRANSFER MANAGEMENT TO PARENT SERVER |

FIG. 23

| FD/CD-ROM STORAGE MEDIUM |
|---|
| DIRECTORY INFORMATION |
| PROGRAM CODE CORRESPONDING TO STEPS IN FLOWCHART ILLUSTRATED IN FIG. 7 |
| PROGRAM CODE CORRESPONDING TO STEPS IN FLOWCHART ILLUSTRATED IN FIG. 12 |
| PROGRAM CODE CORRESPONDING TO STEPS IN FLOWCHART ILLUSTRATED IN FIG. 14 |
| PROGRAM CODE CORRESPONDING TO STEPS IN FLOWCHART ILLUSTRATED IN FIG. 19 |
| PROGRAM CODE CORRESPONDING TO STEPS IN FLOWCHART ILLUSTRATED IN FIG. 22 |
| |

DEVICE MANAGEMENT SYSTEM, SERVERS, METHOD FOR MANAGING DEVICE, AND COMPUTER READABLE MEDIUM

BACKGROUND OF THE INVENTION

1. Field of the Invention

The present invention relates to a method for controlling a device management system in importing a management target device information, and a computer readable medium thereof.

2. Description of the Related Art

Japanese Patent Application Laid-Open No. 2003-316674 discusses a conventional device management system provided with a parent server and a child server in a case where devices are managed in a distributed manner by a plurality of management servers. In such a device management system, a child server generally transmits information about each device existing at each base to a parent server, and the parent sever determines whether the device is a management target.

However, the conventional device management system has problems described as below.

The parent server must have the device information about the device transmitted from the child server for determining whether the device is the management target, and the information needs to be always updated to the latest one.

Further, the parent server needs to perform processing for comparing determining information with the device information transmitted from the child server. Thus, there arises a problem that, as a number of the device of the management target increases, a burden of the parent sever also increases.

Further, if the parent server centrally manages the device information managed by the child server, a content that is individually set and managed by the child sever can be updated by the parent server. Therefore, there arises a problem that contents set in an environment under control of the child server become contradictory.

SUMMARY OF THE INVENTION

The present invention is directed to a method for enabling recognition of all device information in the system in a collective manner, and at the same time for effectively performing the device management among the plurality of servers in the system.

According to an aspect of the present invention, a device management system includes a first server and a second server that is different from the first server. The first server includes a first management unit configured to update and delete device information of a management target device to be managed by the first server. The second server includes a second management unit configured to update and delete device information of a management target device to be managed by the second server and a display unit configured to display device information of a device which is not to be managed by the second server.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating an example of a device list displayed on a user interface of the child server as illustrated in FIG. 1.

FIG. 6 is a diagram illustrating a list of device information managed by the child server as illustrated in FIG. 1.

FIG. 8 is a diagram illustrating an example of a task information table registered by the parent server as illustrated in FIG. 1.

FIG. 9 is a diagram illustrating a list of the device information managed by the parent server as illustrated in FIG. 1.

FIG. 10 is a diagram illustrating an example of a device list displayed by the parent server as illustrated in FIG. 1.

FIG. 11 is a diagram illustrating an example of a device list displayed by the parent server as illustrated in FIG. 1.

FIG. 13 is a diagram illustrating a list of device information managed by the parent server as illustrated in FIG. 1.

FIG. 15 is a diagram illustrating an example of the device information managed by the child server as illustrated in FIG. 1.

FIG. 16 is a diagram illustrating an example of an information determination table about a task type stored in a hard disk (HD) in the child server as illustrated in FIG. 2.

FIG. 23 is a diagram illustrating a memory map of a storage medium for storing various kinds of data processing programs that can be read by the server according to the exemplary embodiment of the present invention.

DETAILED DESCRIPTION OF THE EMBODIMENTS

Various exemplary embodiments, features, and aspects of the invention will be described in detail below with reference to the drawings.

Figure 1:
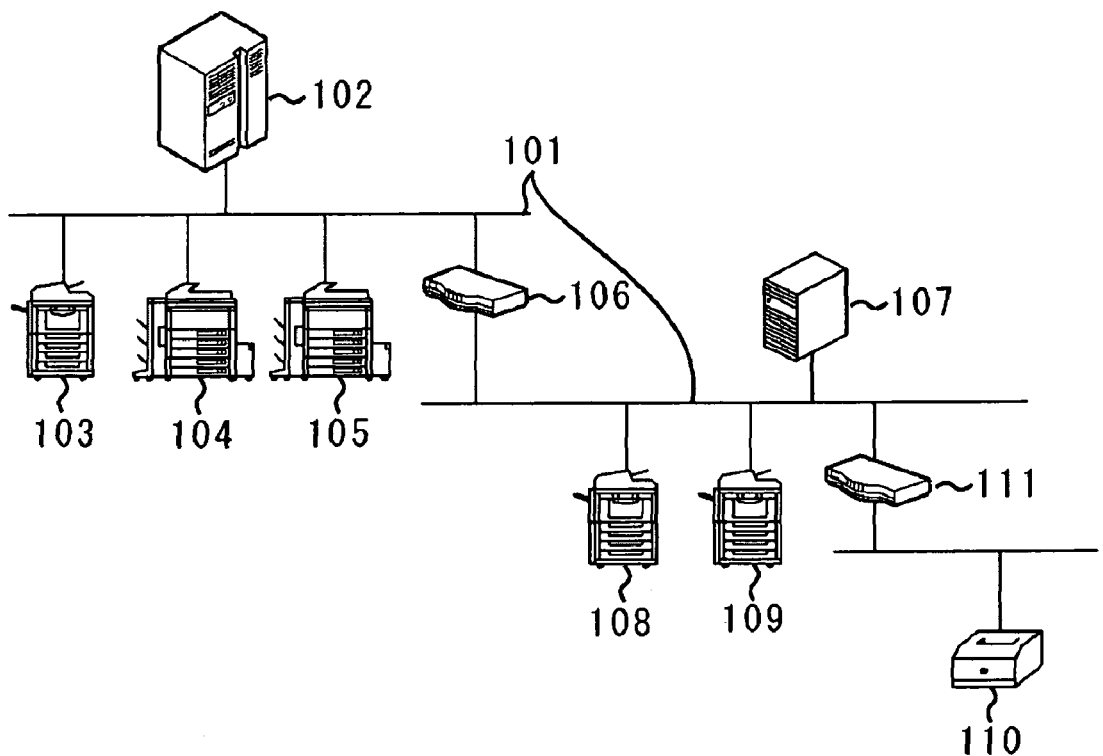
FIG. 1 is a block diagram illustrating a configuration of a device management system according to an exemplary embodiment of the present invention.

FIG. 1 is a block diagram illustrating a configuration of a device management system according to the exemplary embodiment of the present invention. According to the present example, the management system includes a parent server 102 and a child server 107. A number of child servers may be plural, and layers of a network configuration have no particular restriction. Further, the present example includes a printer, multifunction peripheral, and local personal computer (PC) as a device to be controlled, and hereinafter is referred to as a device, for convenience of explanation. As one example of a device management system, the child server 107 functions as a primary server and the parent server as a second server. Details of the system will be described as below.

In FIG. 1, a communication medium (communication line) 101 (e.g., an Ethernet (registered trademark)) serves as a transmission path where communication data is exchanged between the child server 107 and devices 103 to 105 managed by the parent server 102. The child server 107 and the parent server 102 can communicate with each other via a communication line.

The devices 103 to 105 are each managed directly by the parent server 102. The devices 103 to 105 include a multi-function peripheral (MFP) that is a multiple-function peripheral apparatus and a single function printer (SFP) that has only a printer function.

A router 106 connects a network in an environment where the parent server 102 is operated, with a network in an environment where the child server 107 is operated. For sake of simplicity, a router connecting a network in an intranet will be described here. However, a parent server operation environment and a child server operation environment can be connected also via an internet.

A child server 107 directly manages the devices 108 to 110. The devices 108 to 110 are the MFP, however, may be the SFP having only the printer function. When a network environment managed by the child server 107 includes a different subnet, a router 111 connects the subnet to the network. According to the present example, the device 110 is connected to the subnet. A device managed by the server may be a personal computer (PC).

The parent server 102 and the child server 107 include controllers including a central processing unit (CPU), read only memory (ROM), and random access memory (RAM), and are connected to an input device and output device via an interface connected to a system bus. The parent server 102 and the child server 107 are provided with a network controller to communicate with the devices 103 to 105 and the router 106 by a predetermined protocol.

A variety of system programs including an operating system (OS) and applications are installed in an external memory apparatus included in the parent server 102 and child server 107. The CPU in the parent server 102 and child server 107 loads a program into the RAM to perform various data processing. The program includes the procedures as illustrated in the flowchart described below.

Figure 2:
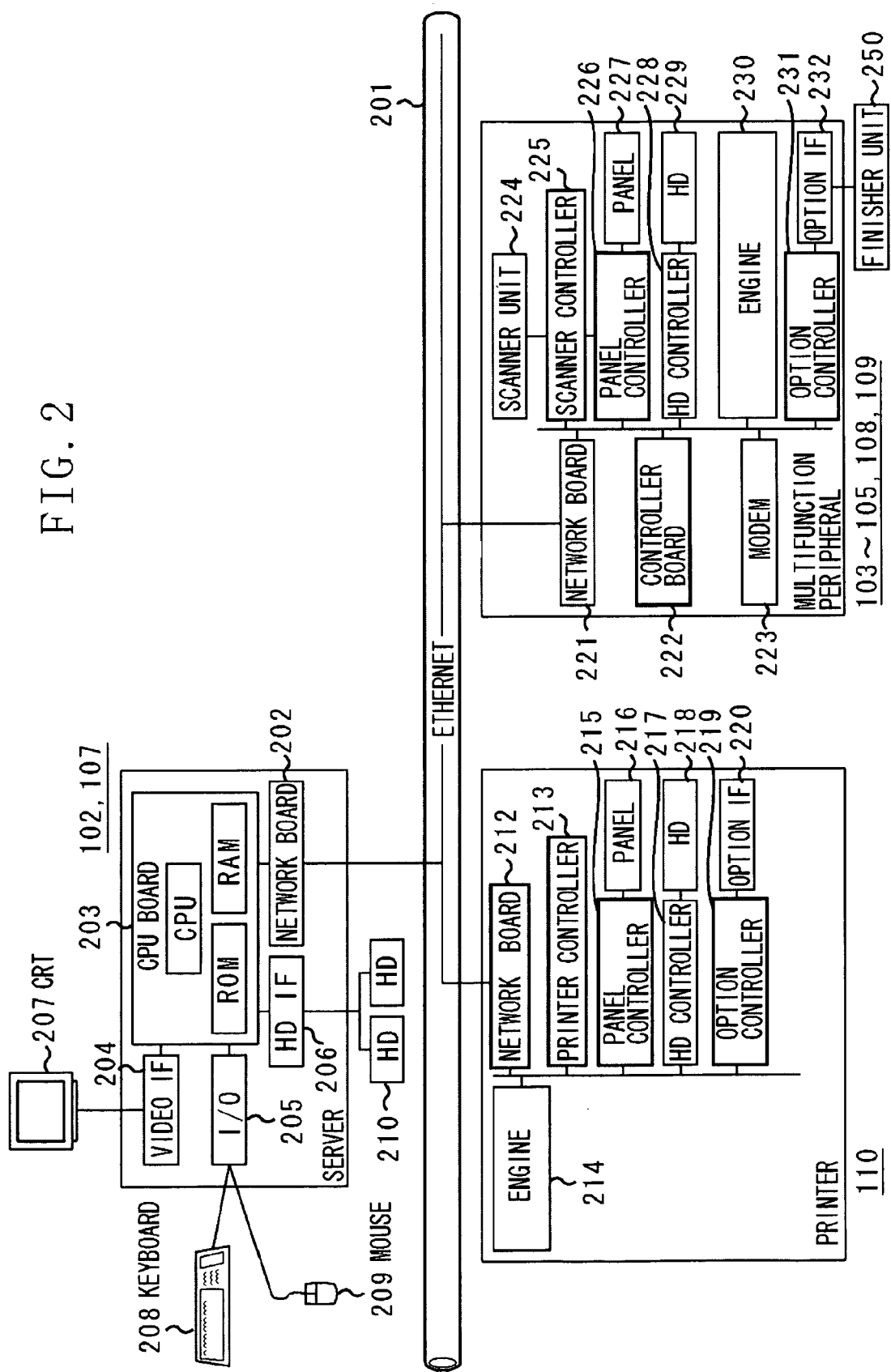
FIG. 2 is a block diagram illustrating a configuration of the device management system as illustrated in FIG. 1.

FIG. 2 is a block diagram illustrating a configuration of the device management system as illustrated in FIG. 1. The device included in the device management system and a hardware of the server will be described.

In FIG. 2, a network medium 201 functions as a physical line forming the network between each device. The Ethernet (registered trademark) is typically used.

The parent server 102 and child server 107 as illustrated in FIG. 1 include a network board 202, a CPU board 203, a Video interface 204, an I/O interface 205, and a disk interface (HDIF) 206. The CPU board 203 includes the CPU, ROM, and RAM.

Further, the parent server 102 and child server 107 include a CRT 207, a keyboard 208, a mouse 209 and a hard disk drive (HD) 210. In the HD 210, a plurality of hard disk units is connected in parallel and data transmission at high speed and reliability is secured.

The HD 210 can establish data base using functions of a software running on the parent server 102 and child server 107. The HD 210 holds device information about each device that is to be searched by communicating with a device. The device information about each device, for example, as illustrated in FIGS. 6 and 9, is held so that a device to be managed by its own server and a device to be managed by the another server can be identified.

The CRT 207 illustrates an example of a display apparatus, and may be a crystal display.

The devices 103 to 105 and devices 108 and 109 include a network board 221 corresponding to a peripheral device, a controller board 222 of a multifunction peripheral apparatus, and a modem 223. Further, the devices 103 to 105 and devices 108 and 109 include a scanner unit 224, a scanner controller 225, an operation panel controller 226, and an operation panel 227.

Further, the devices 103 to 105 and devices 108 and 109 include a hard disk controller 228, a hard disk (HD) 229, a print engine 230, an option controller 231, and an option interface 232. The option interface 232 is configured to be connected to a finisher unit 250.

The devices 103 to 105 and devices 108 and 109 are configured as an MFP according to the present exemplary embodiment.

The device 110 includes a network board 212 corresponding to a peripheral device, a printer function controller board 213, a printer engine 214, an operation panel controller 215 and a operation panel 216.

The device 110 further includes a hard disk controller 217, a hard disk 218, an option controller 219 and an option interface 220.

The device 110 is configured as an SFP according to the present exemplary embodiment.

Figure 3:
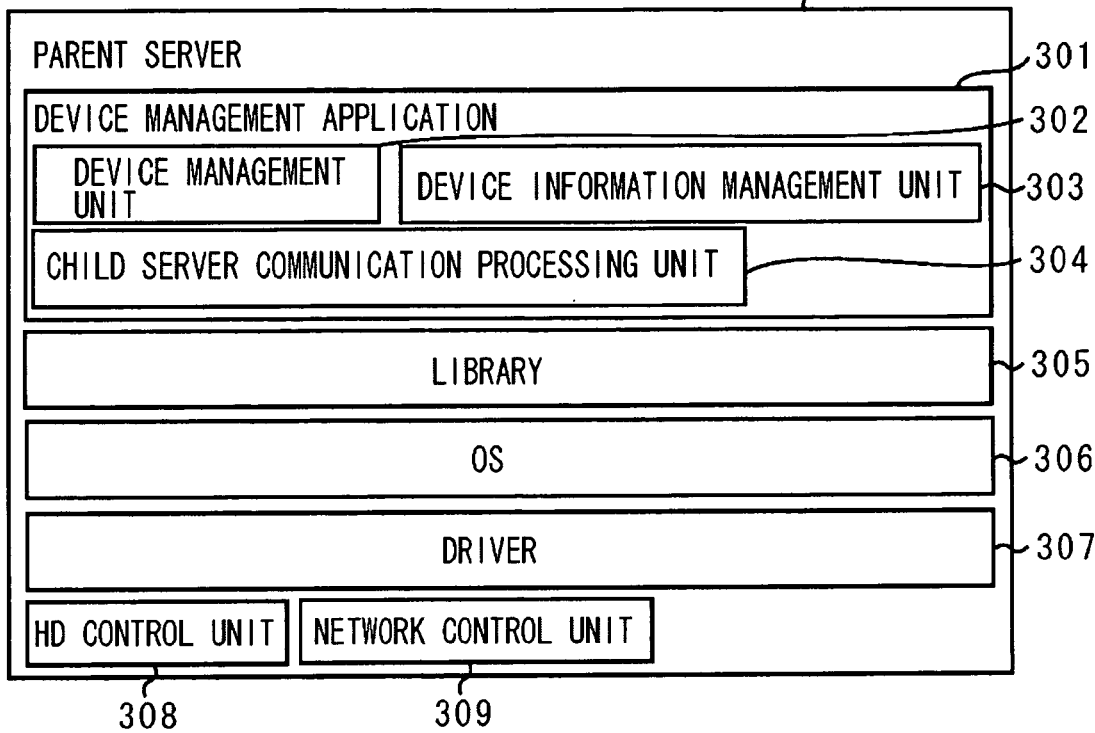
FIG. 3 is a diagram illustrating a configuration of a software module in a parent server as illustrated in FIG. 1.

FIG. 3 is a diagram illustrating a configuration of a software module in the parent server 102 as illustrated in FIG. 1. A configuration of the device management software will be described below.

In FIG. 3, a device management application 301 includes a device management unit 302 that acquires and manages management information such as status of a target device. The device management application 301 includes a device information management unit 303 that manages information about a group of target devices, and a child-server communication processing unit 304 of the child server 107 that communicates with the child server 107 and acquires management device information about the child server 107.

The device management application 301 is executed by the CPU board 203 to function as a second management unit. A library 305 is a group of libraries provided by an OS 306 and functions as a frame work when an application program is established. A driver 307 is a software that controls a hardware and includes a printer driver used for printing. A hard disk control unit 308 (HD control unit) controls access to the HD 210. A network control unit 309 controls communication with a device via the network board 202. The parent server 102 executes the device management software to perform management processing of a device connected to the network.

Figure 4:
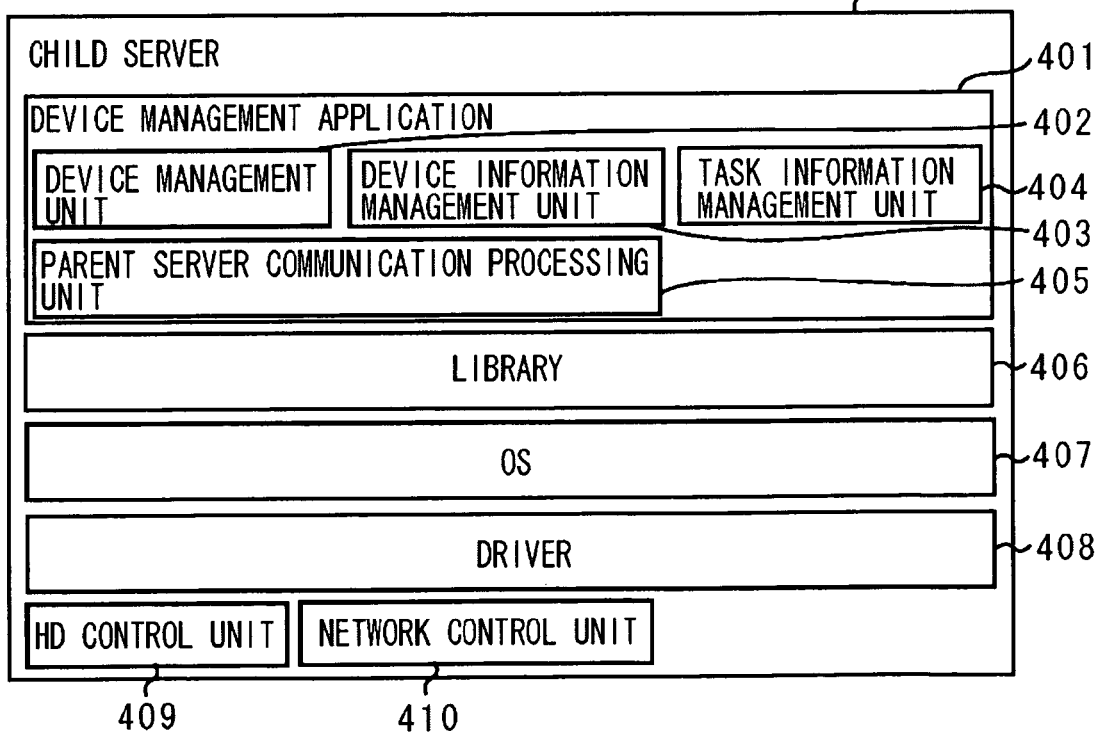
FIG. 4 is a diagram illustrating a configuration of a software module in a child server as illustrated in FIG. 1.

FIG. 4 is a diagram illustrating a software module in the child server 107 as illustrated in FIG. 1. A configuration of the device management software will be described as follows.

In FIG. 4, a device management application program 401 includes the following modules. The device management application program 401 is executed by the CPU board 203 to function as a primary management unit. The device management application program 401 includes a device management unit 402 that acquires and manages the management information such as the status of a management target device. The device management application program 401 includes a device information management unit 403 that manages the information of the group of management target devices.

Further, the device management application program 401 includes a task information control unit 404 that manages information about a processing task such as an acquirement of information and a setting executed for a management target print device that is to be managed by the child server 107. Furthermore, the device management application program 401 includes a parent-server communication processing unit 405 that communicates with the parent server 102 to transmit the management device information of the child server to the parent server 102.

A library 406 is a group of libraries provided by an OS 407 and functions as a framework when the application program is established. A driver 408 is a software for controlling a hardware, and includes a printer driver used for printing. An HD control unit 409 controls an access to the HD 210. A network control unit 410 controls communication with a device via the network board 202. The child server 107 executes the device management software to perform management processing of a device connected to the network.

FIG. 5 is a diagram illustrating an example of a device list displayed on a user interface of the child server 107 as illustrated in FIG. 1. As illustrated in FIG. 5, according to the exemplary embodiment, the devices 108 to 110 in FIG. 1 are on list with each device name Dev 4 to 6.

According to the present exemplary embodiment, as a display item of a device list, in addition to a device name, a product name, information about an IP address and information about a Mac address are displayed. In addition to the items displayed on the device list as illustrated in FIG. 5, status information indicating information such as an error of a print device and information about installation location of a device may be displayed. Further, in addition to the items displayed on the device list as illustrated in FIG. 5, information about a host name and domain of a device, or information about a network communication board mounted in a device may be displayed.

Furthermore, information about characteristics such as a processing speed of a device, information about a total number of processing performed by a device, comment on a setting of a device performed by a administrator can be displayed. If the MFP and SFP are used as the device, the processing speed of the device can be a print processing speed, and the information about a number of total processing can be a total number of prints.

Referring to FIG. 5, in the child server 107, a user interface 501 includes a check box for determining whether a administrator of the child server transfers management of a management target device to the parent server 102. The administrator of the child server 107 can perform a setting to discontinue subsequent management by checking "transfer management to parent server" when the management of the device is determined to be centrally performed by the parent server 102.

On the other hand, if the check box is not checked, a setting can be made in which the unique management and setting can be continued in the child server 107. The user interface illustrated in FIG. 5 corresponds to a status in which two devices having device names, Dev4 and Dev5, are set as management targets by the parent server 102.

Referring to FIG. 6, an example of information of a management target device in the child server 107 will be described. In this case, a management target server is set using the user interface 501. FIG. 6 is a diagram illustrating a list of device information managed by the child server 107 as illustrated in FIG. 1. In the present example of a table, the information about the management target device is centrally managed in the child server 107. The information about the devices 108 to 110 managed by the child server 107 is currently stored. In the example, information about the devices 108 to 110 include identification information for identifying a device such as a device name, IP address, and MAC address.

The information can be acquired by searching the device connected to the network by the device management unit 402 installed in the child server 107, in the environment of the child server 107. As a searching method, the child server 107 transmits to the network a searching packet using a simple network management protocol (SMNP).

After the child server 107 transmits the SNMP, information about the device that has responded to the protocol is acquired, and the device information management unit 403 stores the acquired information in the storage region (for example, the HD 210) of the child server 107, and the search is completed. In addition to the SNMP protocol, the searching protocol such as a service location protocol (SLP) and a web service on devices (WSD) can be utilized as a searching method.

Since a protocol used for a device search varies depending on searching performance of the child server 107 and a function of a device existing in the network, a protocol to be used is not particularly specified.

In FIG. 6, a device name 601 stores a name of a device connected to the network which is found by the searching processing. An IP address 602 stores an IP address of a searched device. A MAC address 603 stores a MAC address of a searched device. A current management server 604 stores information of a server that currently manages a device of Devs 4 to 6 (corresponding to 108 to 110 as illustrated in FIG. 1) stored in the device name 601. In FIG. 6, it is assumed that the current child server 107 searches for the information and stores the information itself. Therefore, a "child server" and the information is stored in an area of the current server 604.

Reference numeral 605 denotes an attribute when the parent server refers to the device information. When the child server 107 works together with the parent server 102 and the parent server 102 refers to the information about the management target device of the child server 107, information indicating a selection status, i.e. whether management of a target device is transferred to the parent server or the child server (itself) continuously performs the management, is stored in the attribute 605.

According to the present exemplary embodiment, when the child server itself continues the management, information of "reading only" is set. With this setting, the child server can identify a management target device of itself and a management target device of the other server. Further, in the user interface 501 as illustrated in FIG. 5, when the administrator checks the check box corresponding to "management is transferred to parent server", the subject region is set to a value indicating "transferred to parent server".

On the other hand, in the user interface 501 as illustrated in FIG. 5, if the administrator does not check the check box corresponding to "management is transferred to parent server", the subject region is set to a value indicating "reading only".

Figure 7:
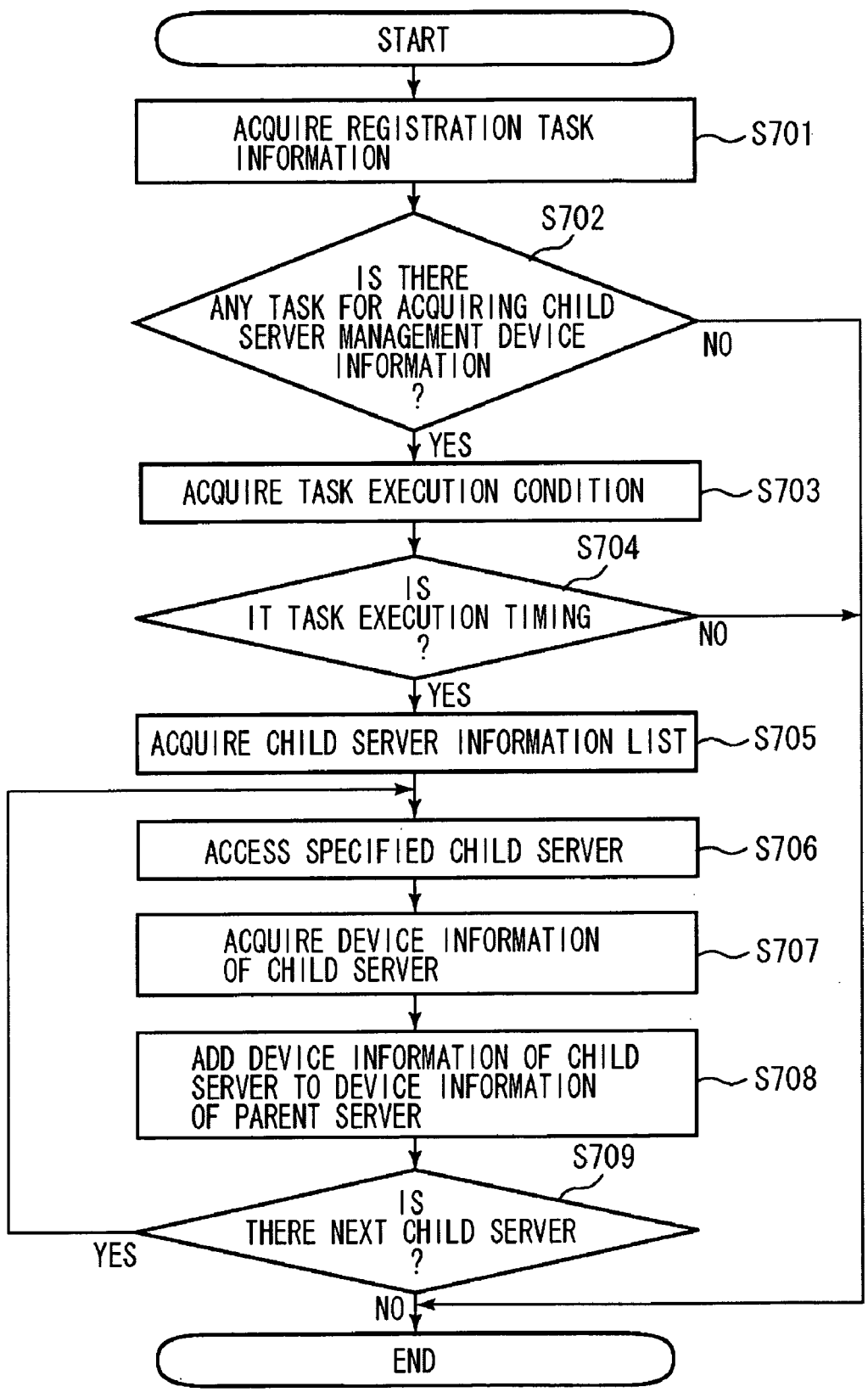
FIG. 7 is a flowchart illustrating an example of a data processing procedure in a management apparatus according to the exemplary embodiment of the present invention.

Referring to FIG. 7, a flow of processing performed when the parent server 102 acquires the information about the management target device of the child server 107 will be described.

FIG. 7 is a flowchart illustrating an example of a data processing procedure in a management apparatus according to the present exemplary embodiment. The present exemplary embodiment illustrates an example when the parent server 102 acquires the information about the management target device of the child server 107. The CPU of the CPU board 203 as illustrated in FIG. 2 loads onto the RAM and executes the device management application 301 to realize each step.

The processing is started by a scheduler program when check timing comes. The scheduler program periodically carries out check whether the device management application 301 starts up a processing task related to the device management that is registered in the parent server 102. The check by the scheduler program is repeatedly performed at a predetermined interval and never stops while the device management application 301 is running. In step S701, the processing task information registered by the parent server 102 is acquired by the device management unit 302 of the device management application 301 in the parent server 102.

FIG. 8 is a diagram illustrating an example of a task information table registered by the parent server 102 as illustrated in FIG. 1. The present example illustrates the task information that is registered in the parent server 102 and centrally managed. According to the present example, in FIG. 8, the task information table stores information about a name of a registered task and a type of the registered task and information of execution timing of the registered task and a target device that is a processing target of the registered task.

The execution timing is stored as information indicating that an execution is carried out only once at a specified date, or as information about an interval at which execution is periodically carried out. In step S702, based on information acquired in S701, the device management unit 302 determines whether a task for acquiring management device information from the child server 107 is registered. If the device management unit 302 determines that the task for acquiring the management device information from the child server 107 is not registered (NO in step S702), the processing is ended and waits for a next start of the scheduler program.

On the other hand, in step S702, if the device management unit 302 determines that a task for acquiring the management device information from the child server 107 is registered (YES in step S702), the processing proceeds to step S703. In step S703, the device management unit 302 acquires the information about the execution timing of the processing task acquired from the child server 107 in step S701.

In step S704, referring to the execution timing information in the processing task information acquired in step S703, the device management unit 302 determines whether the task execution timing has come. If the device management unit 302 determines that the task execution timing has not come (NO in step S704), the processing is ended and waits for a next start of a scheduler program. On the other hand, in step S704, if the device management unit 302 determines that the task execution timing is to be performed (YES in step S704), the processing proceeds to step S705.

In step S705, referring to the target information as illustrated in FIG. 8, the device management unit 302 acquires a list of the child server 107 from which the management device information is acquired. In the present example, a target stores information about only one child server, however, the target can store information about a plurality of child servers. In addition, information for identifying a target in subsequent communication processing such as an IP address is stored.

In step S706, communication is established between the child-server communication processing unit 304 in the parent server 102 and the parent-server communication processing unit 405 in the child server 107 and a request is made to the child server 107 to acquire information of the device that the child server 107 manages. The communication between the parent server 102 and the child server 107 generally uses the web service. However, as long as the communication and data exchange is possible between the parent server 102 and the child server 107, any protocol and method can be used.

In step S707, the parent server 102 acquires the information about the management target device from the child server 107, and the device management unit 302 temporarily stores the acquired information in the RAM of the parent server 102 or the memory region such as the HD 210. When the information about the management target device of the child server 107 is acquired, data is converted to a format in which the data can be transmitted by a communication protocol between the parent server 102 and the child server 107. When the data is received, it is returned to an original form.

In step S708, the device management unit 302 performs processing in which the management device information of the child server 107 acquired in step S707 is added to the device information managed by the parent server 102.

FIG. 9 is a diagram illustrating a list of the device information managed by the parent server 102 as illustrated in FIG. 1. The present example illustrates a table to which the information of the manage target device of the child server 107 is added in the parent server 102. In FIG. 9, a device name 901 stores a name of a device connected to the network which is acquired by searching processing. An IP address 902 stores an address of the searched device.

A MAC address 903 stores a MAC address of the searched device. A current management server 904 stores information of a server that currently manages the devices of Devs 1 to 6 (Devs 4 to 6 correspond to 108 to 110) stored in the device name 901. Reference numeral 905 denotes an attribute when the parent server refers to the device information. The attribute 905 indicates a status in which the device information managed by the child server 107 is added by the adding processing in step S708 as illustrated in FIG. 7. When information of a current management server 904 is referred to, the current management server of Devs 4 to 6 is "child server". Accordingly, it can be seen that the information of the management device is acquired from the child server 107.

Further, the attribute 905 when the parent server refers to the device information indicates that the check box of the user interface 501 as illustrated in FIG. 5 is not set in the information about Dev 6. Accordingly, the child server 107 still manages the information, and it can be seen that the attribute is "reading only". As described above, according to the present exemplary embodiment, the parent server 102 can centrally manage the device information of a plurality of devices managed by the child server 107. Further, the parent server 102 can centrally manage the device information of a part of devices among the plurality of devices managed by the child server 107.

After the information of the management device of the child server 107 acquired in step S705 is added to the management device information of the parent server 102, the processing proceeds to step S709. Instep S709, the device management unit 302 determines whether there is any child server left from which the device information is to be acquired, from the information list of the child server acquired in step S705.

If the device management unit 302 determines that there is a target child server from which the device information is acquired (YES in step S709), the processing returns to step S706, and the above-mentioned processing is repeated. If the device management unit 302 determines that there is no target child server left (NO in step S709), the processing is ended and waits for a next start of the scheduler program.

FIG. 8 is a diagram illustrating an example of a device list displayed by the parent server 102 immediately after the processing illustrated in FIG. 7 is ended. FIGS. 10 and 11 are diagrams each illustrating an example of a device list displayed by the parent server 102 illustrated in FIG. 1. The present example illustrates a display of the device information to be managed by the child server 107 but not to be managed by parent server 102.

In FIG. 10, a management server 1801 is displayed based on the current management server 904 of the device information managed by the parent server as illustrated in FIG. 9. By referring to an item of the current management server 904, if the current management server is itself, that is, the parent server, the information about a target device is normally displayed. Thus, it is expressly displayed that the parent server itself manages the device information.

On the other hand, if the information of the current management server 904 displays the child server, in order to expressly display that the information has been just acquired from the child server, the CPU board 293 performs control to display the information of the current server 904 in gray on the CRT 207. A screen as illustrated in FIG. 11 is an example of a screen which is displayed immediately after the content illustrated in FIG. 10 is updated, that is, immediately after the information is re-acquired from the device displayed on list information. A management server 1091 shows a status in which a status of the management server 1801 is updated to "reading only".

Figure 12:
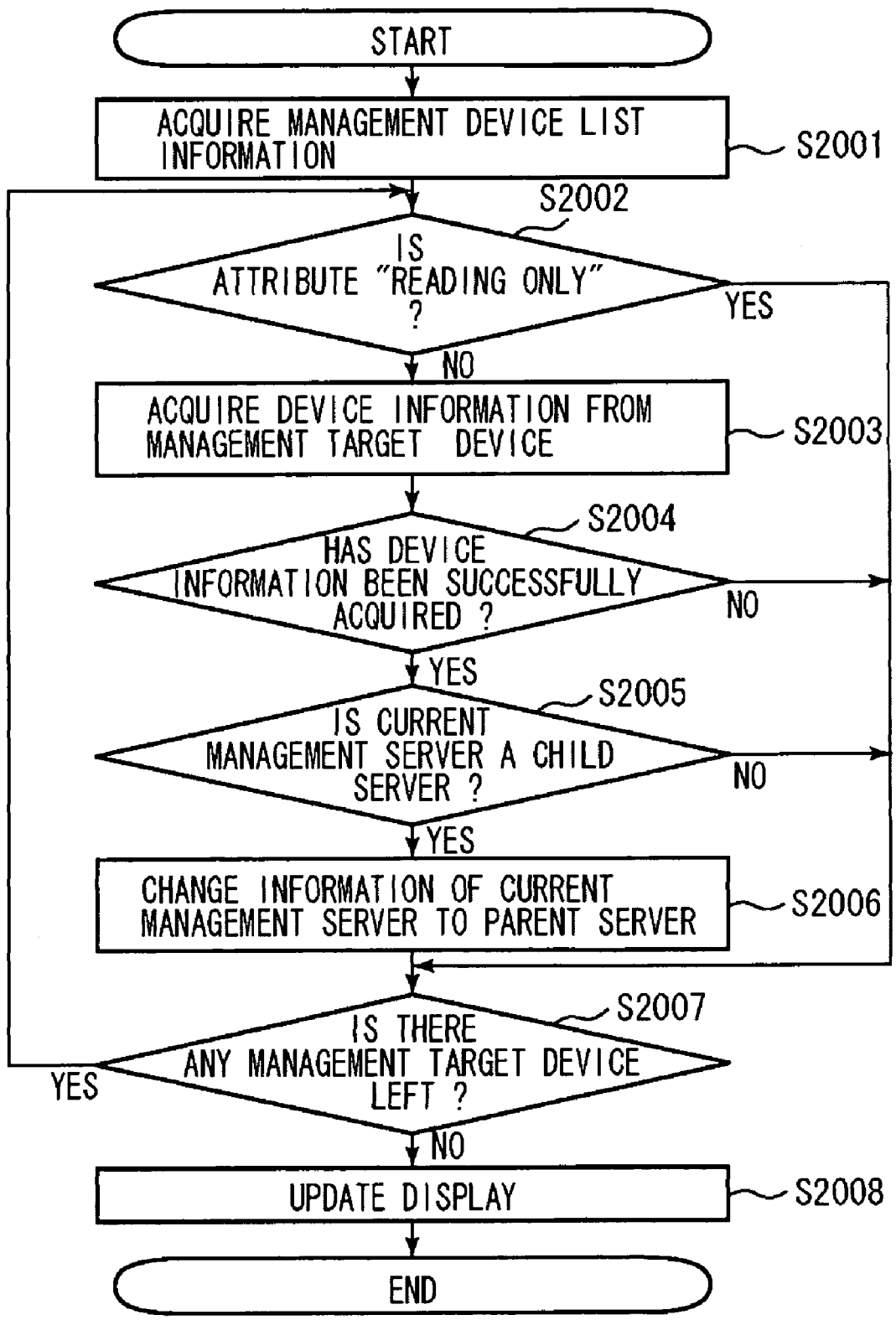
FIG. 12 is a flowchart illustrating an example of a data processing procedure in the management apparatus according to the exemplary embodiment of the present invention.

FIG. 12 is a flowchart illustrating an example of the data processing procedure in the management apparatus according to the exemplary embodiment of the present invention. The present example illustrates processing in which the parent server 102 re-acquires and updates the device information of the child server 107. The CPU of the CPU board 203 as illustrated in FIG. 2 loads onto the RAM and executes the device management application 301 to realize each step.

In step S2001, the device management unit 302 acquires the information about the management target device from the child server set as the current management server 904 as illustrated in FIG. 9. In addition, the device information added to the management target device of the parent server 102 is acquired from an external memory region of the parent server 102. In step S2002, the device management unit 302 determines whether the information of the attribute 905 when the parent server refers to the management target device, has an attribute "reading only". If the device management unit 302 determines that the attribute is "reading only" (YES in step S2002), the processing proceeds to step S2007.

On the other hand, when the device management unit 302 determines that the attribute is not "reading only" in step S2002, in other words, the referred device is the device to be managed by the parent server 102 (NO in step S2002), the processing proceeds to step S2003. In step S2003, the device management unit 302 acquires the device information from the device referred to in step S2002.

In step S2004, the device management unit 302 determines whether the device information is successfully acquired from the target device. If the device management unit 302 determines that the device has been successfully acquired (YES in step S2004), the processing proceeds to step S2005. If the device management unit 302 determines that the information has not been acquired (NO in step S2004), the processing proceeds to step S2007.

In step S2005, by referring to the information about the current management server 904 of the device whose information has been successfully acquired, the device management unit 302 determines whether the current management server 904 is the child server. If the device management unit 302 determines that the current management server 904 is the child server (YES in step S2005), the processing proceeds to step S2006. If the device management unit 302 determines that the current management server 904 is the parent server (NO in step S2005), the processing proceeds to step S2007. In step S2006, the device management unit 302 changes the information about the current management server 904 to the parent server.

In step S2007, the device management unit 302 determines whether there is any management target device on which the above processing has not been performed. If the device management unit 302 determines that there is a device on which the processing has not been performed (YES in step S2007), the processing returns to step S2002. Then, the processing described above is repeated. If the device management unit 302 determines that there is no device on which the processing is not performed (NO in step S2007), the processing proceeds to step S2008.

In step S2008, the device management unit 302 updates the display of the device information and the processing is ended. Here, the parent server 102 normally displays the device information to indicate that the device having the device information about the current management server 904 as a parent server is the device to be managed by the parent server.

On the other hand, information about the current management server 904 that remains to be the child server is displayed in gray (in FIG. 10, illustrated in hatching). In this case, the parent server 102 expressly displays the "reading only" as to the reading only attribute as illustrated in the management server 1901 in FIG. 11.

FIG. 13 is a diagram illustrating a list of device information managed by the parent server 102 as illustrated in FIG. 1. The present example illustrates a list of device information corresponding to a display screen as illustrated in FIG. 11 after the processing illustrated in FIG. 12 is performed on the list illustrated in FIG. 9.

Figure 14:
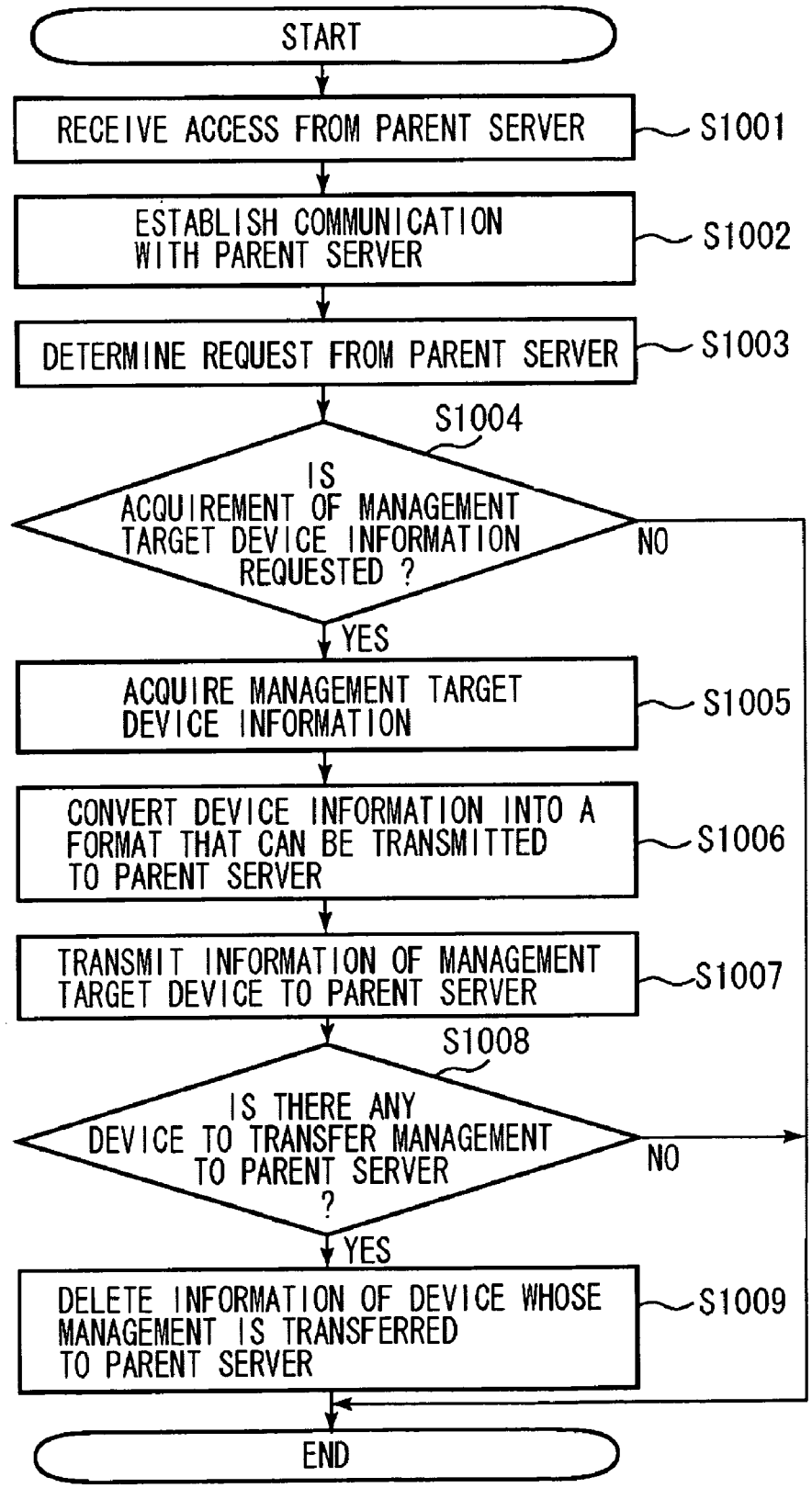
FIG. 14 is a flowchart illustrating an example of a data processing procedure in the management apparatus according to the exemplary embodiment of the present invention.

FIG. 14 is a flowchart illustrating an example of the data processing procedure in the management apparatus according to the present exemplary embodiment. The present example illustrates an example of update processing on the management information on the side of the child server 107, which has acquired the device information of the management target from the parent server 102. The CPU of the CPU board 203 of the child server 107 as illustrated in FIG. 2 loads onto the RAM and executes the device management application 301 to realize each step. First, in step S1001, when the parent-server communication processing unit 405 detects that the parent server 102 requests access to the child server 107, the process proceeds to step S1002.

In step S1002, a pre-processing for establishing communication between the parent-server communication processing unit 405 and the child-server communication processing unit 304 in the parent server 102, is executed to prepare for subsequent processing. The parent server 102 has requested the device information about the management target of the child server 107. Here, the web service is used in general for the parent server 102 and the child server 107, however, other communication method may also be used for exchanging data.

In step S1003, the device management unit 402 determines a requested type from the parent server 102. In step S1004, the device management unit 402 determines whether the acquirement request from the parent server 102 received in step S1003 is a request for acquiring the device information of the management target of the child server 107. If the device management unit 402 determines that the device information of the management target of the child server 107 is requested (YES in step S1004), the processing proceeds to step S1005. On the other hand, if the device management unit 402 determines in step S1004 that the device information of the management target of the child server 107 is not requested (NO in step S1004), the processing is ended.

In S1005, the device management unit 402 acquires the device information about the management target device of the child server 107 as illustrated in FIG. 6 from the external storage region (HD 210) of the child server 107 and expands the device information in the RAM for the subsequent processing steps described below. In step S1006, the device information of the management target device of the child server 107 acquired from the HD 210 in step S1005 is converted into a data format in which the data can be transmitted to the parent server 102.

In step S1007, the parent-server communication processing unit 405 transmits to the parent server 102 the device information about the management target of the child server 107 converted in step S1006 into the format that enables transmission. In step S1008, the device management unit 402 determines whether there is any device showing "transfer management to parent server" in an attribute information area set when the parent server refers, among the device information managed by the child server 107 as illustrated in FIG. 6.

If the device management unit 402 determines that the device having the setting of "transfer management to parent server 102" exists (YES in step S1008), the processing proceeds to step S1009. On the other hand, in S1008, if the device management unit 402 determines that the device whose management is transferred to the parent server 102 does not exist (NO in step S1008), the device management unit 402 determines that the child server 107 continues to manage all the devices, and the processing is ended.

In step S1009, from among the device information about the management target of the child server 107 as illustrated in FIG. 6, the device management unit 402 deletes the device information as to which the management is transferred to the parent server 102, in other words, the device information that the child server 107 discontinues to manage, and the processing is ended. With this processing, the device information doubly managed by the child server and the parent server is provided with the attribute of "reading only" for the parent server, and the information of the device whose management is transferred to the parent server is deleted from the child server. Thus, the contradiction of the setting system can be removed.

FIG. 15 is a diagram illustrating an example of the device information managed by the child server 107 as illustrated in FIG. 1. The present example illustrates the device information that the device information management unit 403 refers to after the processing in step S1009 is executed on the device information managed by the child server 107 illustrated in FIG. 6. The device management unit 402 may delete the device information of the device whose management is transferred to the parent server 102 when the parent server 102 informs that the setting of the device management is completed. Thus, between parent and child servers, the device information can be securely transferred. In the present exemplary embodiment, the device information may be periodically transmitted from the child server 107 to the parent server 102.

The device information transmitted from the child server 107 in step S1007 may be specification information (such as a device name) for specifying the device and specification information for specifying whether the parent server or child server is used in the management. For example, when the device information managed by the child server 107 is transmitted, only the information such as a device name and a device installation place may be transmitted and the information unnecessary for the management in the parent server 102 may not be transmitted.

Alternatively, the child server 107 may transmit all the information about the device, and the parent server 102 may perform control to determine as to the device information whether only browsing can be possible, or updating and deleting of the information and distribution and management of the setting information can be performed.

Next, it is assumed that in the user interface 501 illustrated in FIG. 5, "transfer management to parent server" is not checked and it is specified that the child server 107 continues the management of the device. The processing for determining whether the management of the device is transferred to the parent server 102 will be described as follows. When the check box is not checked for "transfer management to parent server" in the user interface 501 as illustrated in FIG. 5, the administrator of the child server 107 determines that the child server 107 continuously manages the device.

On the other hand, the device having a check on the check box can be determined to be the device that the parent server manages. However, in order to determine once again whether the child server continues to uniquely manage the device, in other words, the parent server does not centrally manage the device, it needs to be determined whether the child server has performed setting processing.

The setting processing refers to a task in which writing is performed on the device of the management target, and a task having influence on behaviors of the target device. The setting processing includes, for example, a device setting distribution task, a device restart task, or an address book distribution to the device.

In the external storage apparatus such as the HD 210 within the child server 107, a table for determining task type information is previously stored when installed so that the task information control unit 404 can refer.

Figures 17, 18:
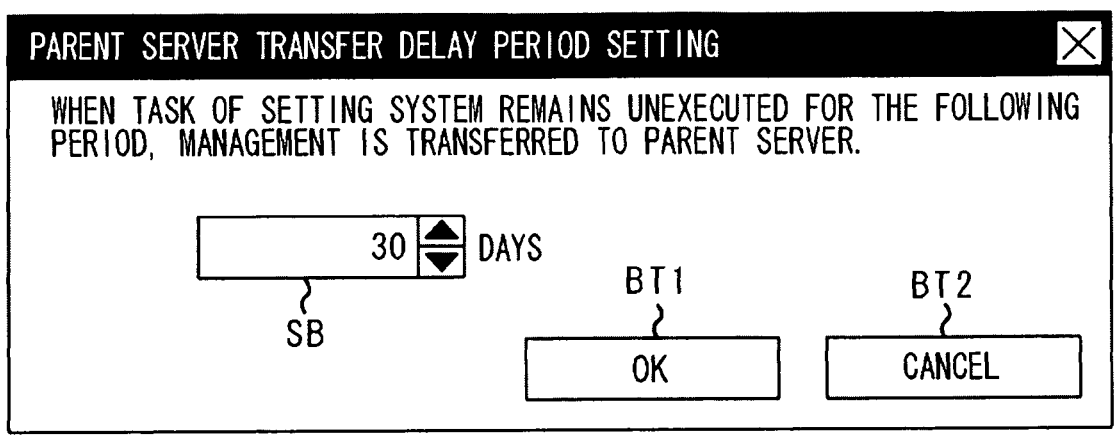
FIG. 17 is a diagram illustrating an example of a user interface displayed on a cathode-ray tube (CRT) provided in the child server as illustrated in FIG. 2.
FIG. 18 is a diagram illustrating an example of an execution history information table of a task to which a task information managing unit of the child server refers as illustrated in FIG. 4.

FIG. 16 is a diagram illustrating an example of the table for determining task type information stored in a hard disk (HD) 210 in the child server 107 as illustrated in FIG. 2. The present example illustrates settings for task types such as device search, setting distribution, restart, error monitor, acquirement of a number of prints, print resources distribution and address book distribution. FIG. 17 is a diagram illustrating an example of a user interface displayed on a cathode-ray tube (CRT) 207 provided in the child server 107 as illustrated in FIG. 2. The present example illustrates the user interface for setting a delay period when the management is transferred to the parent server.

More specifically, the present example illustrates a user interface for setting to the task information control unit 404 the delay time until a message urging to review continuation of management by the child server 107 is displayed for the administrator of the child server 107 when the task of a setting system executed in the past exceeds a given period. In FIG. 17, a SB is a spin box, and the administrator operates the mouse 209 to set the delay period ("30" days for current display) in transferring the device information to the parent server. An OK bottom BT1 functions as a button for fixing the delay period to be set. A cancel button BT 2 functions as a button for canceling the set delay period.

Accordingly, a display screen as illustrated in FIG. 17 indicates that the child server 107 displays a message informing that the management is transferred to the parent server 102, when the child server 107 does not execute a task that has a setting system having a threshold value "30 days". Upper and lower limits of the period for setting the delay period are not particularly determined according to the present exemplary embodiment.

FIG. 18 is a diagram illustrating an example of an execution history information table of a task that a task information managing unit 404 of the child server 107 refers to as illustrated in FIG. 4. The present example illustrates an execution history information table about the task that the device management unit 402 of the child server 107 as illustrated in FIG. 4 have executed in the past. FIG. 18 includes a task name of the task that has been executed in the past, information about the type of the execution task, information about the execution date of the executed task, information about the target device when the task is executed. However, the above-described information is just an example. In addition to the above-mentioned information, other information may also be included.

Figure 19:
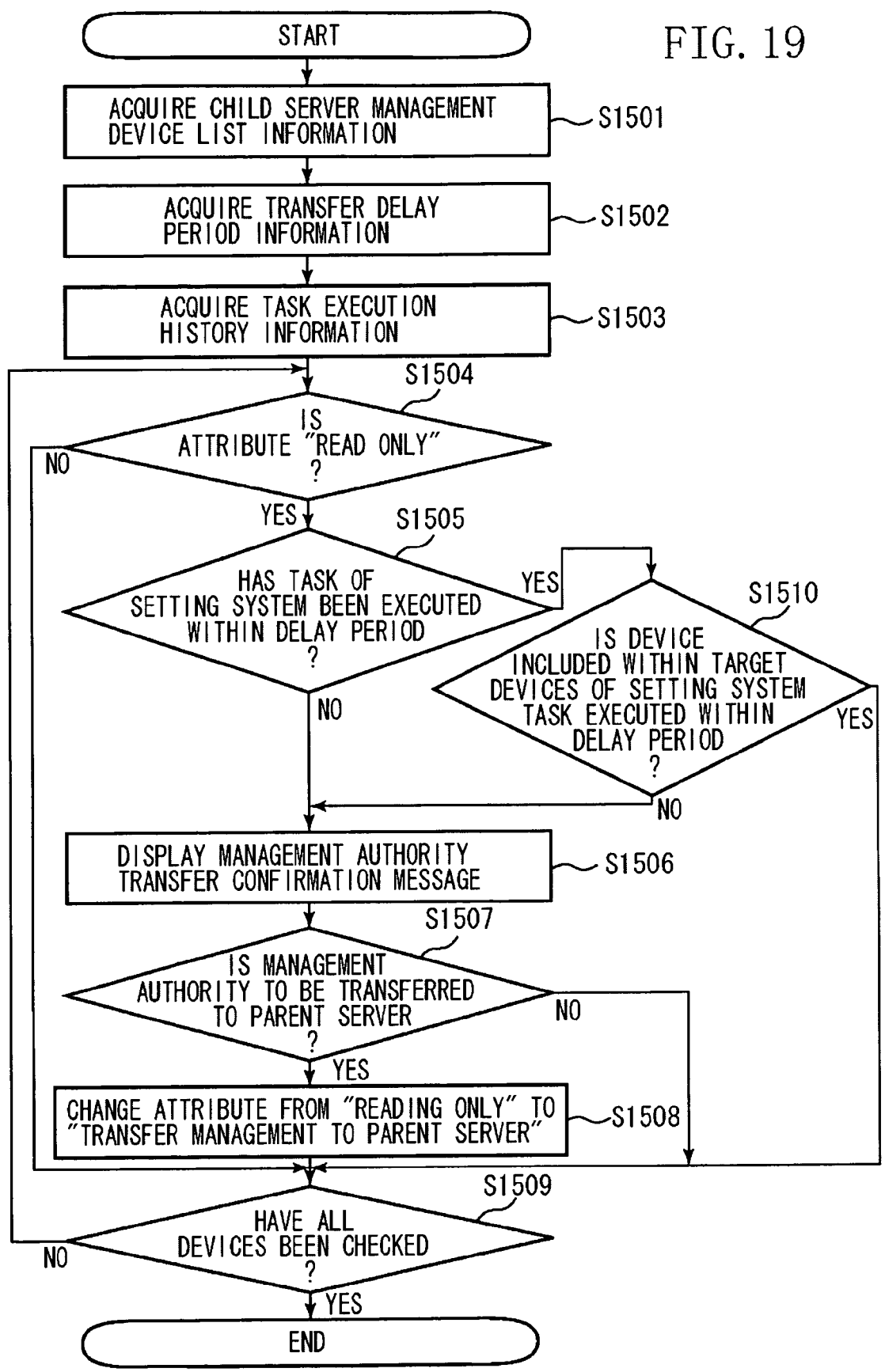
FIG. 19 is a flowchart illustrating an example of a data processing procedure in the management apparatus according to the exemplary embodiment of the present invention.

Referring to the information illustrated in the FIGS. 16 to 18, the continuous management of the device by the child server 107 will be described. Referring to FIG. 19, a flow of processing for determining whether the management is to be transferred to the parent server 102 will be described.

FIG. 19 is a flowchart illustrating a data processing procedure in the management apparatus according to the exemplary embodiment of the present invention. The present example illustrates processing for determining whether the device managed by the child server 107 is to be transferred to the parent server 102. The CPU of the CPU board 203 of the child server 107 as illustrated in FIG. 2 loads onto the RAM and executes the device management application device management application program 401 to realize each step.

In step S1501, the device information management unit 403 acquires the device information about the device of the management target as illustrated in FIG. 6 to be managed by the child server 107. When the task of the setting system set by the administrator of the child server 107 via the user interface for setting the delay period as illustrated in FIG. 17 is not executed, the setting information about the delay period for transferring the management of the device to the parent server 102 is acquired in step S1502. The task information control unit 404 reads out control information described above from the HD 210. In step S1503, the task information control unit 404 acquires the task execution history information table carried out by the child server 107 as illustrated in FIG. 18.

In step S1504, the device management unit 402 sequentially refer to the device information about the management target device acquired in step S1501 to determine whether the attribute 605 of the device currently referred to is "reading only" when the parent server refers as illustrated in FIG. 6. When the device management unit 402 determines that the attribute is "reading only" (YES in step S1504), the processing proceeds to step S1505. When the attribute is not "reading only", in other words, the attribute is "transfer management to parent sever" (NO in step S1504), the processing proceeds to step S1509.

The device management unit 402 compares the acquired task execution history information in the child server, the information about the delay period acquired in step S1502, and the content of the task execution history information as illustrated in FIG. 16. In step S1505, the device management unit 402 determines whether the setting system task is executed within the delay period.

Now, referring to FIGS. 16 to 18, the details will be described.

The device management unit 402 determines that the setting system task was executed within the delay time until May 30, 2007 and the setting system task is not executed within the delay time since May 31, 2007. When the device management unit 402 determines that the setting system is executed within the delay period (YES in step S1505), the processing proceeds to step S1510. When the device management unit 402 determines that the setting system is not executed within the delay period (NO in step S1505), the processing proceeds to step S1506.

On the other hand, in step S1510, the device management unit 402 determines whether a target device of the setting system task executed within the delay period includes the device referred to in step S1504, from the task execution history information in the child server illustrated in FIG. 18.

When the device management unit 402 determines that the setting system task is executed (YES in step S1510), the child server 107 continuously manages the device. Accordingly, the processing proceeds to step S1509 without performing particular processing. On the other hand, in step S1510, when the device management unit 402 determines that the setting system task is not executed according to a result of the determination (NO in step S1510), the child server 107 does not continuously manage the device. Accordingly, the process proceeds to step S1506.

Figures 20, 21:
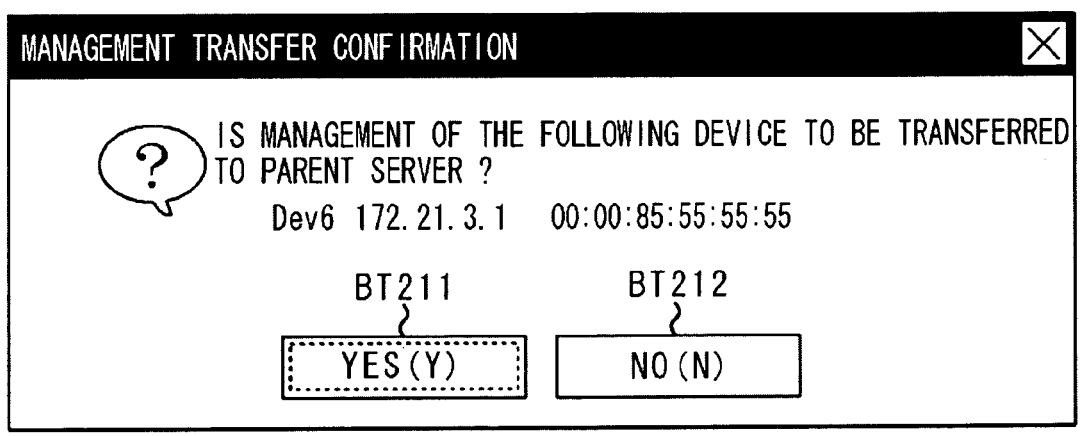
FIG. 20 is a diagram illustrating an example of a user interface displayed on the management apparatus according to the exemplary embodiment of the present invention.
FIG. 21 is a diagram illustrating a list of the device information managed by the child server as illustrated in FIG. 1.

In step S1506, the device management unit 402 displays confirmation message as illustrated in FIG. 20 on the CRT 207 of the child server 107, which indicates whether the management is to be transferred to the parent server 102 as to the device referred to in step S1504. The administrator of the child server determines whether to transfer the management, in response to the confirmation message as illustrated in FIG. 20, by operating the mouse 209 to select any of the BT 211 and the BT 212.

FIG. 20 is a diagram illustrating an example of a user interface displayed on the management apparatus according to the exemplary embodiment of the present invention. The present example corresponds to a screen that displays a message for confirming whether the administrator of the child server transfers the management of the device to the parent server. Thus, the management server can be easily selected via the user interface. At a time, a message is displayed to prompt a user to transfer the management server of a device on which the setting task is not executed for a predetermined period and the practical management can be performed by the server.

In step S1507, it is determined whether the administrator of the child server selects the BT 211 corresponding to "yes" in a screen as illustrated in FIG. 20 in response to the confirmation message as illustrated in FIG. 20. More specifically, it is determined whether the management authority is to be transferred to the parent server 102.

When, the device management unit 402 determines that the BT 211 is selected, in other words, the management is transferred (YES in step S1507), the processing proceeds to step S1508. On the other hand, in FIG. 20, if the device management unit 402 determines that the BT 212 corresponding to "no" is selected, in other words, the management is not transferred to the parent server (NO in step S1507), the process proceeds to step S1509.

In step S1508, the device management unit 402 changes the content of the attribute 605 of the device referred to in step S1504 when the parent server refers, from "reading only" to "transfer management to parent server". FIG. 21 is a diagram illustrating a list of the device information managed by the child server 107 as illustrated in FIG. 1. The present example corresponds to the list of the device information in which the content of the attribute 605 of the device name Dev 6 when the parent server refers is changed from "reading only" to "transfer management to parent server", in other words, the list of the device information after step S1508 is executed.

In step S1509, the device management unit 402 determines whether, in the information table related to the management target device of the child server acquired in step S1501, all of the management target devices are checked. When the device management unit 402 determines that there is a device that has not been checked (NO in step S1509), the process returns to step S1504 and the above-described processing is repeated.

On the other hand, in step S1509, if the device management unit 402 determines that all the devices are checked (YES in step S1509), the process is ended. The processing may be set to be performed once a day by the device management application program 401.

Figure 22:
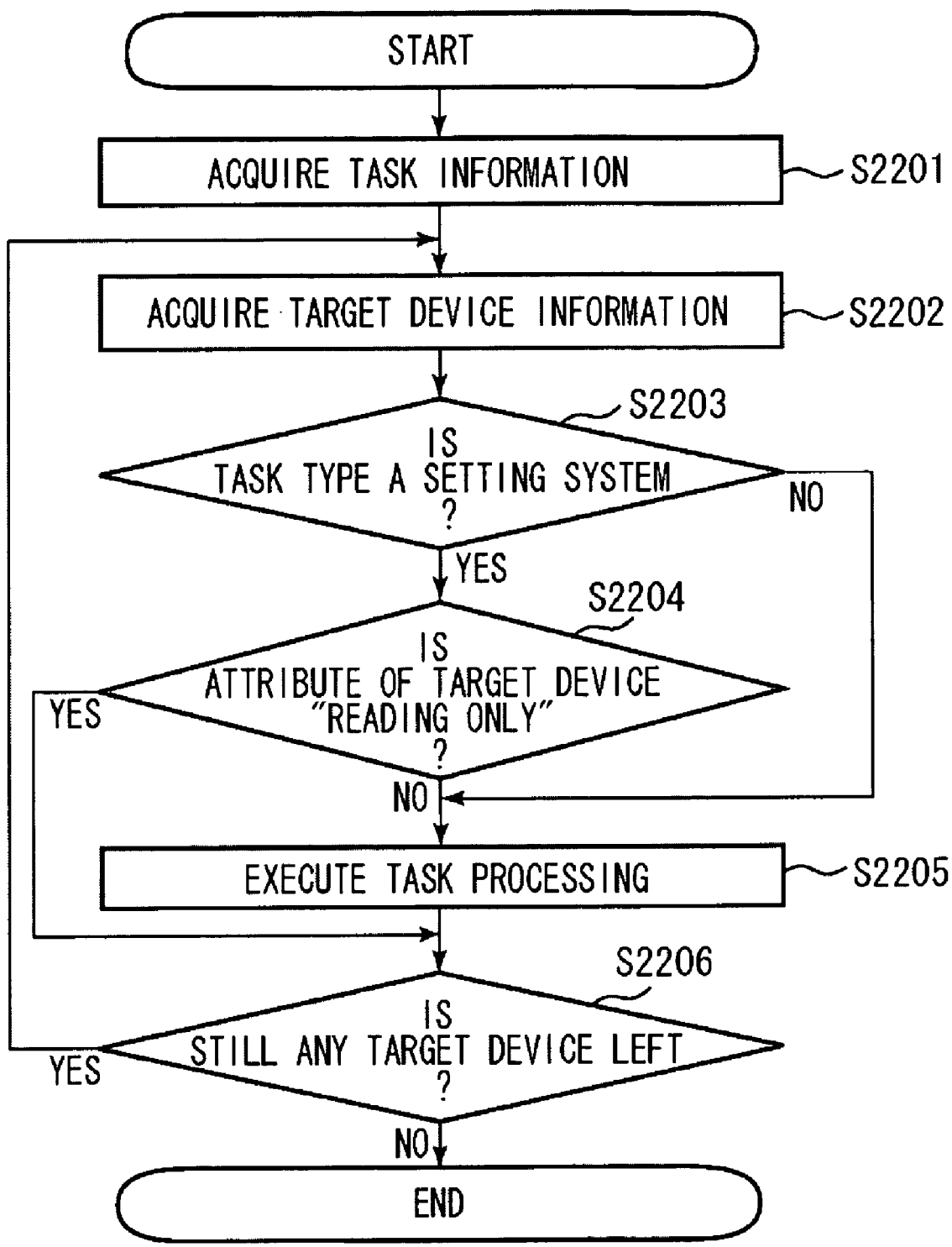
FIG. 22 is a flowchart illustrating an example of a data processing procedure in the management apparatus according to the exemplary embodiment of the present invention.

Referring to FIG. 22, a flow of the task execution by the parent server when the device having the attribute "reading only" is included in the target device to be managed by the parent server will be described. FIG. 22 is a flowchart illustrating an example of the data processing procedure in the management apparatus according to the exemplary embodiment. The present example illustrates the task execution processing by the parent server when the device having the attribute "reading only" is included in the target device to be managed by the parent server. The CPU of the CPU board 203 of the child server 107 as illustrated in FIG. 2 loads onto the RAM and executes the device management application device management application 301 to realize each step.

In step S2201, the device management unit 302 acquires the information related to a task such as the processing content of the task that has started an execution. The information determination table as illustrated in FIG. 16 with respect to the task type and its execution content is stored in the HD 210 which the device management application 301 of the parent server can refer to.

In step S2202, the device management unit 302 acquires the device information registered as a target of the relevant task from among the processing task information table registered by the parent server as illustrated in FIG. 8. In step S2203, the device management unit 302 determines whether the task type acquired in step S2201 is the task of the setting system for setting the target device.

If the device management unit 302 determines that the task type is the setting (YES in step S2203), the process proceeds to step S2204. If the device management unit 302 determines the task type is not the setting, in other words, the task is an information acquirement (NO in step S2203), the process proceeds to step S2205. In step S2204, the device management unit 302 determines whether the target device has the attribute "reading only", by referring to the attribute information when the parent server refers in the parent server management target device management list as illustrated in FIG. 13.

In step S2204, if the device management unit 302 determines that the target device has the attribute "reading only" (YES in step S2204), the processing proceeds to step S2206 without performing the task processing. On the other hand, in step S2204, if the device management unit 302 determines that the target device does not have the attribute "reading only" (NO in step S2204), the processing proceeds to step S2205 and the task processing is performed on the target device. After the task processing has been performed, the processing proceeds to step S2206.

In step S2206, the device management unit 302 checks whether there is any target device of the task left. When the device management unit 302 determines that there is a device on which the task has not been performed (YES in step S2206), the processing returns to step S2202 and the above-described processing step is repeated.

On the other hand, in step S2206, if the device management unit 302 determines that the task processing is executed on all of the target devices and there is no target device on which the task has not been performed (NO in step S2206), the processing is ended.

Thus, when the child server continuously manages the device, the child server can provide the parent server with the existence information of "reading only" by the processing described above. Further, after the management device information whose management is transferred to the parent server is acquired by the parent server, the management device information is deleted from the management target device of the child server.

Furthermore, also with respect to the device continuously managed by the child server, a message for prompting the transformation of the management can be displayed when the task of the setting system has not been executed. FIG. 23 is a diagram illustrating a memory map of a storage medium for storing various kinds of data processing programs that can be read by the server according to the exemplary embodiment of the present invention.

Information for controlling a group of programs stored in the storage medium (not illustrated), for example, version information and an editor are also stored. Further, information depending on the OS at a reading-out side, for example, an icon for identifying and showing a program can be stored. Further, the directory described above manages the data subject to various programs. Furthermore, a program for installing various programs into a computer is stored. When a program for installing the various programs is compressed, a program for unfreezing the program can be also stored.

The functions as illustrated in FIGS. 7, 12, 14, 19 and 22 according to the present exemplary embodiment may be executed by a host computer. In that case, from a storage medium such as a CD-ROM, a flush memory, and a FD, or an external storage medium via a network, a group of information including a program can be supplied to an output apparatus as an application of the present invention.

As described above, the storage medium that stores a program code of a software realizing functions of the exemplary embodiment described above is supplied to a system or an apparatus. A computer (or the CPU or MPU) of the system or the apparatus reads out and executes the program code stored in the storage medium to realize the present invention.

In this case, the program code itself read out from the storage medium can realize a new function and the storage medium that stores the program code constitutes the present invention. Accordingly, as long as the program has a function as the program, a form of the program is not limited. The type of program can be selected from any one of an object code, a program executed by an interpreter, and script data for supplying for the OS.

As a storage medium for supplying the program, for example, a floppy disk, hard disk, optical disk, optical magnetic disk, MO, CD-ROM, CD-R, CD-RW, magnetic tape, nonvolatile memory card, ROM, and DVD can be used. In this case, the program code itself read out from the storage medium realizes the functions of the exemplary embodiments as described above, and, thus, the storage medium that stores the program code constitutes the present invention.

In addition, the program can be supplied by connecting to a web site of the Internet using a browser of a client computer. The computer program itself of the exemplary embodiment of the present invention or a compressed file including an automatic installation function can be downloaded from the web site into the storage medium such as a hard disk. Further, the program code forming the program of the exemplary embodiment of the present invention is divided into a plurality of files, and each of the files can be downloaded from the different web sites to realize the invention. In other words, the present invention includes a WWW server and an ftp server enabling a plurality of users to download the program for realizing functional processing of the exemplary embodiment of the present invention by the computer.

Further, the program of the exemplary embodiment of the present invention is encoded and stored in the storage memory such as a CD-ROM to be distributed to the users. The user who satisfies a predetermined condition is allowed to download key information for decoding the encoded program from a web site via the Internet. Using the key information, the user can execute the program and install it in the computer to realize the present invention.

The program code read out by the computer is executed not only for realizing the functions of the exemplary embodiments described above, but also, for example, based on an instruction of the program code, the OS operated in the computer executes a part or all of the actual processing. The case in which the processing realizes the functions of the exemplary embodiments can also be included in the present invention.

Further, the program code read out from the storage medium is written in a function extension board inserted into the computer or a memory provided in a function extension unit connected to the computer. Based on the instruction of the program code, the CPU provided in the function extension board or the function extension unit executes a part or all of the processing to realize the functions of the exemplary embodiment as described above. Such a case is also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-041978 filed Feb. 22, 2008, which is hereby incorporated by reference herein in its entirety.

What is claimed is:

1. A device management system including a first server and a second server that is different from the first server,
the first server comprising:
a first management unit configured to update or delete device information about a management target device to be managed by the first server; and
a transmission unit configured to transmit, for transferring a management right to the second server, identification information pertaining to the management target device to be managed by the first server to the second server; and
the second server comprising:
a second management unit configured to update or delete device information about a management target device to be managed by the second server; and
a display unit configured to display device information about a plurality of devices,
wherein the plurality of devices includes (i) a device that is a management target to be managed by the second server and (ii) a specific device that is a management target to be managed by the first server and of which is not a management target to be managed by the second server that cannot update or delete the device information pertaining to the management target device managed by the first server,
wherein the transmission unit transmits the identification information of the specific device to the second server in a case when a period of non-updating or non-deleting of the device information pertaining to the specific device by the first management unit exceeds a threshold value.

2. A device management method for managing a device management system including a first server and a second server that is different from the first server, the method comprising:
causing the first server to update or delete device information about a management target device to be managed by the first server;
causing the first server to transfer a management right to the second server including identification information pertaining to the management target device to be managed by the first server to the second server;
causing the second server to update or delete device information about a management target device to be managed by the second server; and
causing the second server to display device information about a plurality of devices, wherein the plurality of devices includes (i) a device that is a management target to be managed by the second server and (ii) a specific device that is a management target to be managed by the first server and of which is not a management target to be managed by the second server that cannot update or delete the device information pertaining to the management target device managed by the first server,
wherein the identification information of the specific device is transferred to the second server in a case when a period of non-updating or non-deleting of the device information pertaining to the specific device exceeds a threshold value.

3. A server comprising:
a holding unit configured to hold identification information for identifying a device that can communicate via a communication line;
a management unit configured to update or delete device information about a management target device that is to be managed by the server among devices that are identified by the identification information held in the holding unit;
a transmission unit configured to transmit the identification information held in the holding unit to another server such that the management target device to be managed by the server can be identified from the management target device to be managed by the another server; and a deleting unit configured to delete the identification information of the management target device to be managed by the another server, from the holding unit, without a deletion of the identification information of the management target device to be managed by the server, after the identification information is transmitted by the transmission unit, wherein the identification information is transmitted to the another server to enable a display unit of the another server to display a plurality of devices which includes a device that is a management target to be managed by the another server and a device that is a management target to be managed by the server and of which is not a management target to be managed by the another server that cannot update or delete the device information pertaining to the management target device managed by the server.

4. The server according to claim 3, wherein the transmission unit transmits the identification information that can identify the device as a management target to be managed by the another server in a case a period of non-updating or non-deleting of the device information exceeds a threshold value, among devices identified by the identification information held by the holding unit.

5. The server according to claim 4, further comprising:

a display unit configured to display a screen for confirming whether a device is to be managed by the another server in a case a period of non-updating or non-deleting of the device exceeds a threshold value, among devices identified by the identification information held by the holding unit.

6. A device management method for a server provided with a holding unit for holding identification information for identifying a device that can communicate via a communication line, the method comprising:

updating or deleting device information about a management target device to be managed by the server among devices identified by the identification information held the holding unit;

transmitting the identification information held by the holding unit to another server such that the management target device to be managed by the server can be identified from a management target device to be managed by the another server; and deleting the identification information of the management target device to be managed by the another server, from the holding unit, without a deletion of the identification information of the management target device to be managed by the server, after the identification information is transmitted, wherein the identification information is transmitted to the another server to enable a display unit of the another server to display a plurality of devices which includes a device that is a management target to be managed by the another server and a device that is a management target to be managed by the server and of which is not a management target to be managed by the another server that cannot update or delete the device information pertaining to the management target device managed by the server.

7. The device management method according to claim 6, further comprising deleting the identification information about the target device to be managed by the another server, from the holding unit after the identification information is transmitted.

8. The device management method according to claim 6, further comprising transmitting the identification information that can identify a device as a management target to be managed by the another server in a case a period of non-updating or non-deleting of the device information exceeds a threshold value, among devices identified by the identification information held by the holding unit.

9. A device management method according to claim 8, further comprising displaying a screen for confirming whether a device is to be managed by the another server in a case a period of non-updating or non-deleting of the device information exceeds a threshold value, among devices identified by the identification information held by the holding unit.

10. A device management method between a server and another server, the method comprising:

receiving identification information, for identifying a device held by the another server, from the another server;

updating or deleting device information about a management target device to be managed by the server but non-updating or non-deleting device information about a device specified as a management target to be managed by the another server, based on attribute information for specifying a management target device to be managed by the another server that is received together with the identification information, among devices identified by the received identification information; and displaying device information of a device identified by the identification information and displaying (i) a device that is a management target to be managed by the server and (ii) a specific device that is a management target to be managed by the another server and of which is not a management target to be managed by the server that cannot update or delete the device information pertaining to the management target device managed by the server, wherein identification information pertaining to the specific device is received by the another server in a case a period of non-updating or non-deleting of the device information pertaining to the specific device exceeds a threshold value.

11. The device management method according to claim 10, further comprising receiving the device information from the another server, wherein the device information includes the identification information.

12. A non-transitory computer readable medium containing computer-executable instructions for controlling a server provided with a holding unit for holding identification information for identifying a device that can communicate via a communication line, the medium comprising:

computer-executable instructions for updating or deleting device information about a management target device to be managed by the server among devices identified by the identification information held the holding unit;

computer-executable instructions for transmitting the identification information held by the holding unit to another server such that the management target device to be managed by the server can be identified from a management target device to be managed by the another server; and computer-executable instructions for deleting the identification information of the management target device to be managed by the another server, from the holding unit, without a deletion of the identification information of the management target device to be managed by the server, after the identification information is transmitted, wherein the identification information is transmitted to the another server to enable a display unit of the another server to display a plurality of devices which includes a device that is a management target to be managed by the another server and a device that is a management target to be managed by the server and of which is not a management target to be managed by the another server that cannot update or delete the device information pertaining to the management target device managed by the server.

13. A non-transitory computer readable medium containing computer-executable instructions for implementing a device management method between a server and another server, the medium comprising:

computer-executable instructions, for receiving identification information for identifying a device held by the another server, from the another server;

computer-executable instructions for updating or deleting device information about a management target device to be managed by the server but non-updating or non-deleting device information about a device specified as a management target to be managed by another server, based on attribute information for specifying a management target device to be managed by the another server that is received together with the identification information, among devices identified by the received identification information; and computer-executable instructions for displaying device information of a device identified by the identification information and wherein the display unit displays (i) a device that is a management target to be managed by the server and (ii) a specific device that is a management target to be managed by the another server and of which is not a management target to be managed by the server that cannot update or delete the device information pertaining to the management target device managed by the server, wherein identification information pertaining to the specific device is received by the another server in a case a period of non-updating or non-deleting of the device information pertaining to the specific device exceeds a threshold value.

* * * * *